United States Patent [19]

Takayama et al.

[11] Patent Number: 5,223,565
[45] Date of Patent: Jun. 29, 1993

[54] POLYMERIZABLE COMPOSITIONS

[75] Inventors: Yuuji Takayama, Kanagawa; Hirokazu Matsueda, Aichi; Maseto Sugiura, Aichi; Tatsuhiko Ozaki, Aichi; Hirotaka Wada, Aichi; Iwao Komiya, Aichi, all of Japan

[73] Assignee: Takemoto Yushi Kabushiki Kaisha, Aichi, Japan

[21] Appl. No.: 704,454

[22] Filed: May 23, 1991

[30] Foreign Application Priority Data

May 29, 1990 [JP] Japan .................................. 2-138882
Nov. 28, 1990 [JP] Japan .................................. 2-332244

[51] Int. Cl.$^5$ .......................... C08J 3/02; C08K 3/10; C08L 75/00; C08F 263/00
[52] U.S. Cl. .................................. 524/437; 524/507; 524/521; 524/535; 524/534; 525/278; 525/455; 525/920; 526/301; 528/60
[58] Field of Search .................. 525/278, 455, 920; 524/437, 507, 525, 555, 521, 533, 534, 535, 590; 526/301; 528/60

[56] References Cited

U.S. PATENT DOCUMENTS

| 3,954,714 | 5/1976 | Kuehn | 525/920 |
| 4,347,174 | 8/1982 | Nagase et al. | 526/301 |
| 4,608,409 | 8/1986 | Coady et al. | 526/301 |
| 4,868,325 | 9/1989 | Reiners et al. | 526/301 |

Primary Examiner—Paul R. Michl
Assistant Examiner—Patrick Niland
Attorney, Agent, or Firm—Heller, Ehrman, White & McAuliffe

[57] ABSTRACT

Molded products with improved dimensional stability and surface property can be obtained by in-mold curing of a polymerizable composition containing unsaturated urethane of a specified structure, alkyl (meth)acrylate, and a thermoplastic macromolecular compound capable of dissolving in or swelling by impregnating alkyl (meth)acrylate. These components are contained at specified weight ratio. The mold is initially at temperature 30°~120° C. and the curing is effected in the presence of a radical initiator.

3 Claims, No Drawings

POLYMERIZABLE COMPOSITIONS

BACKGROUND OF THE INVENTION

This invention relates to polymerizable compositions.

Known methods of producing molded products by in-mold curing of polymerizable composition include the resin transfer molding (RTM) whereby a polymerizable composition is transferred into a mold for curing, the casting molding, the reaction injection molding (RIM) and the pultrusion whereby a bundle of fibers for reinforcement is preliminarily impregnated with a polymerizable composition prior to an in-mold curing process. The present invention relates to a polymerizable composition containing unsaturated urethane of a specified structure, alkyl (meth)acrylate and thermoplastic macromolecular compound capable of dissolving in or swelling by impregnating alkyl (meth)acrylate. The invention also relates to a method of producing molded products with improved dimensional stability and surface property by in-mold curing of such a polymerizable composition at a specified initial mold temperature.

As examples of polymerizable compositions containing unsaturated urethane having within its molecule a group with radical polymerization characteristics and a urethane bond, U.S. Pat. No. 4,480,079 has proposed those containing polyisocyanates having more than two isocyanate groups in the molecule or polyurethane polyisocyanates, unsaturated urethane obtainable from hydroxyalkyl (meth)acrylate, and alkyl (meth)acrylate. If a product is produced by in-mold curing of such a prior art polymerizable composition containing unsaturated urethane obtained from polyisocyanates and hydroxyalkyl (meth)acrylate, however, the mold shrinkage is large due to the structure of the unsaturated urethane and, as a result, one can obtain only molded products with poor dimensional stability and surface property with prominent visual discernment of reinforcing fiber patterns. Even if use is made of a low shrinking agent containing known thermoplastic macromolecules in order to reduce the mold shrinkage, there is a phase separation of the low shrinking agent on the surface of the molded product. In other words, there is hardly any preventive effect on the mold shrinkage and the molded product has its surfaces contaminated by the phase-separated low shrinking agent. If a product is obtained by in-mold curing of the aforementioned prior art polymerizable composition containing unsaturated urethane obtainable from polyurethane polyisocyanate and hydroxyalkyl (meth)acrylate, its mold shrinkage is smaller than if unsaturated urethane is used and there are some improvements in dimensional stability and surface property but the degree of such improvements is not satisfactorily large. Even if a low shrinking agent is used together, the mold shrinkage cannot be further improved.

U.S. Pat. No. 4,374,229 has proposed polymerizable compositions containing unsaturated urethane and vinyl monomers obtainable by coupling oligomer polyester having hydroxy end group at one end and vinyl end group at the other end with polyisocyanate. Even if such polymerizable compositions are used for in-mold curing, one can obtain only products with poor dimensional stability and surface property as in the case of using the prior art polymerizable composition, and the additional use of a low shrinking agent hardly has any effect.

SUMMARY OF THE INVENTION

It is therefore an object of the invention in view of the products with reduced mold shrinkage and hence improved dimensional stability and surface property can be obtained by in-mold curing, and to provide methods of using such compositions to produce in-mold cured products.

To attain the above and other objects, the present invention discloses the use of a polymerizable composition characterized as containing unsaturated urethane shown by Formula 1 below, alkyl (meth)acrylate, and a thermoplastic macromolecular compound capable of dissolving in or swelling by impregnating alkyl (meth)acrylate:

where X is a residual group obtainable by removing two isocyanate group from diisocyante having no urethane bond in the molecule; Y is a residual group obtainable by removing three hydroxy group from trihydric or polyol; $R^1$, $R^2$ and $R^3$ are same or different, each being H or $CH_3$; and q is an integer $1\sim 5$.

DETAILED DESCRIPTION OF THE INVENTION

The unsaturated urethane in the description given above of the polymerizable compositions according to the present invention is a urethane-producing reaction product between radical polymerizable ester mono-ol and diisocyante. Examples of such unsaturated urethane include products of urethane-producing reaction between radical polymerizable ester mono-ol derived from (meth)acrylic acid and trihydric alcohol, or polyol having 3 hydroxyl groups in the molecule (such radical polymerizable ester mono-ols being hereinafter referred to simply as ester mono-ols) mono(meth)acrylate and diisocyanate compound having no urethane bond in the molecule (hereinafter referred to simply as diisocyanate).

Examples of aforementioned ester mono-ol include (1) trihydric alcohol di(meth)acrylates such as glycerine diacrylate, glycerine dimethacrylate, trimethylol propane dimethacrylate, 5-methyl-1,2,4-heptane triol, dimethacrylate and 1,2,6-hexane triol dimethacrylate, and (2) (poly)ether triol di(meth)acrylates such as ethyleneglycol monoglycerylether dimethacrylate, (poly)ethoxylated trimethylol propane dimethacrylate, (poly)-propoxylated trimethylol propane diacrylate, and (poly)ethoxylated glycerine dimethacrylate. The (poly)ether triols to be used for deriving such ester mono-ols are preferably those with molecular weight of less than 100 and more preferably less than 80 per hydroxyl group contained in the molecule.

Examples of diol mono(meth)acrylate to be used include hydroxyalkyl (meth)acrylate and polyalkyleneglycol mono(meth)acrylate. Examples of such diol mono(meth)acrylate include hydroxyethyl methacrylate, hydroxypropyl acrylate, diethyleneglycol monomethacrylate, and tripropyleneglycol monomethacrylate. It is preferable, however, to use hydroxyethyl methacrylate as hydroxyalkyl (meth)acrylate. If polyalkyleneglycol mono(meth)acrylate is used, the number of oxyalkylene groups is preferably 5 or less.

The diisocyanates to be reacted with aforementioned ester mono-ol and diol mono) acrylate are those having no urethane bond in the molecule. Examples of such diisocyanate include diisocyanates such as many kinds of tolylene diisocyanate, methylene-bis-(4-phenyl isocyanate), and hexamethylene diisocyanate As explained above, the unsaturated urethane for the polymerizable composition of the present invention is a reaction product between radical polymerizable ester mono-ol and polyisocyanate but the present invention is not particularly limited by the method of synthesizing the unsaturated urethane. Unsaturated urethane is usually synthesized in an inactive solvent at 30°~80° C. in the presence of a catalyst such as tertiary amine, metallic salt or preferably di-n-butyl tin dilaurate which are well known for the synthesis of polyurethane, It is preferable to adjust the reaction ratio of (diisocyanate)/(ester mono-ol) diol mono (meth)acrylate at the time of the synthesis to 1/1 as the molar ratio of functional groups (NCO/OH) but no serious ill-effects are observed if this ratio is changed within the range of 1/0.95~0.95/1.

Examples of unsaturated urethane include urethane producing reaction product among 1 mole of glycerine dimethacrylate, 1 mole of 2-hydroxyethyl methacrylate and 1 mole of tolylene diisocyanate, urethane producing reaction product among i mole of ethyleneglycol monoglycerylether dimethacrylate, 1 mole of 2-hydroxyethyl methacrylate and 1 mole of tolylene diisocyanate, urethane producing reaction product among 1 mole of tripropyleneglycol monoglycerylether dimethacrylate, 1 mole of 2-hydroxyethyl methacrylate and 1 mole of tolylene diisocyanate, and urethane producing reaction product among 1 mole of ethyleneglycol monoglycerylether dimethacrylate, 1 mole of dipropyleneglycol monomethacrylate and 1 mole of tolylene diisocyanate.

Regarding the polymerizable compositions of the present invention, examples of alkyl (meth)acrylate include (1) lower alkyl acrylates such as methyl acrylate, ethyl acrylate and isopropyl acrylate, and (2) lower alkyl methacrylates such as methyl methacrylate, ethyl methacrylate and isopropyl methacrylate. These alkyl (meth)acrylates may be used singly or as a mixture of two or more, but the use of methyl methacrylate is particularly preferable.

In connection with the polymerizable compositions of the present invention, the thermoplastic macromolecular compounds serve the purpose of preventing mold shrinkage and thereby providing molded products with improved dimensional stability and surface property. There is no particular limitation regarding these thermoplastic macromolecular compositions as long as they dissolve in or swell by impregnating the aforementioned alkyl (meth)acrylate. Examples of such thermoplastic macromolecular compound include (1) polymethacrylates such as polymethyl methacrylate, polyethyl methacrylate and polyisobutyl methacrylate, (2) aromatic vinyl polymers such as styrenedivinyl benzene copolymer, styrene-butadiene block copolymer and styrene-acrylonitrile block copolymer, (3) polyvinyl esters such as polyvinyl acetate and polyvinyl benzoate, and (4) aliphatic polyesters such as polypropylene adipate and poly ε-caprolactone, but polymethyl methacrylate, polyvinyl acetate, polystyrene and styrene-divinyl benzene copolymer are preferable.

As explained above, the polymerizable compositions of the present invention are characterized as containing unsaturated urethane, alkyl (meth)acrylate and thermoplastic macromolecular compound. The ratio (in weight) of their contents (unsaturated urethane)/(alkyl (meth)acrylate) is between 10/90 and 90/10 and more preferably between 40/60 and 75/25. The ratio (unsaturated urethane+alkyl (meth)acrylate)/(thermoplastic macromolecular compound) is 100/1 ~100/100 and more preferable 100/5 ~100/50.

According to the present invention, inorganic filler materials of known kinds in powder form may be contained by the aforementioned polymerizable composition. Their content varies, depending on their kinds, sizes, the method of molding the polymerizable composition and the physical property desired for obtained molded products such as fire-resistance, but the weight ratio (unsaturated urethane+alkyl (meth)acrylate)/(inorganic powder filler)=100/40 ~100/230. Examples of such inorganic powder filler that may be contained include $Al_2O_3 \cdot 3H_2O$, calcium carbonate, silica and calcium sulfate dihydrate ($CaSO_419$ $2H_2O$) but inorganic powder filler with water of crystallization, and $Al_2O_3 \cdot 3H_2O$ in particular, is preferable for improving fire-resistance of obtained molded products. If use is made of $Al_2O_3 \cdot 3H_2O$, fire-resistance of obtained molded products can be sufficiently improved at the weight ratio of (unsaturated urethane+alkyl (meth)acrylate) / ($Al_2O_3 \cdot 3H_2O$)=100/65.

In a production method according to the present invention, use may be made of a radical initiator such as an organic peroxide in order to carry out in-mold curing of the aforementioned polymerizable compositions. Examples of such organic peroxide include (1) diacyl peroxides such as dilauroyl peroxide, dibenzoyl peroxide and substituted benzoyl peroxide having a substituted group such as methyl group or methoxy group in aromatic group, (2) alkyl peroxy carboxylates such as t-butyl peroxy octoate, and t-butyl peroxy benzoate, (3) diaryl peroxides and dialkyl peroxides such as dicumyl peroxide, di-t-butyl peroxide, and 1,1-bis(t-butyl peroxy)-3,3,5-trimethyl cyclohexane, and (4) peroxy carbonates such as t-butyl peroxy-2-ethylhexyl carbonate.

In a production method according to the present invention, use may also be made of a curing accelerator together with a radical initiator. Examples of such curing accelerator include aromatic tertiary amines such as dimethyl aniline and dimethyl-p-toluidine.

There are no particular limitations as to the amounts of such radical initiators and curing accelerators that may be used according to a method of the present invention. The amount of radical initiators to be used is generally 0.2~2 weight parts per 100 weight parts as the sum of unsaturated urethane and alkyl (meth)acrylate. The amount of curing accelerator to be used depends on the temperature of molding as well as on the kinds of unsaturated urethane, alkyl (meth)acrylate and the radical initiator but is usually no more than 1 weight part per 100 weight parts as the sum of unsaturated urethane and alkyl (meth)acrylate. In the case of in-mold curing at initial mold temperature of less than 50° C., it is advantageous to make additional use of a curing accelerator in order to increase the speed of curing.

The method of curing applicable to the production according to the present invention is not particularly limited as long as it is a molding method by in-mold curing. Particularly advantageous molding methods include the resin transfer molding (RTM), the casting molding and the reaction injection molding (RIM). According to one of the methods for using these processes, a solution in which a mixture of specified amounts of unsaturated urethane, alkyl (meth)acrylate, thermoplastic macromolecular compounds and a curing accelerator is dissolved and another solution of a radical initiator are prepared, a measuring pump is used to transfer them at a specified ratio, the solutions are mixed together by means of a static mixer and thereafter the mixture is placed inside a mold to obtain a molded product by in-mold curing.

Within the scope of the present invention, reinforcing fibers such as a glass fiber mat, woven material and strands may be preliminarily set inside the mold into which polymerizable compositions are transferred so as to obtain a molded product reinforced by such material.

In connection with the present invention, "initial mold temperature" means the temperature at which the mold is preliminarily kept before a polymerizable composition is transferred thereinto. The initial mold temperature is between 30° C. and 120° C. and more preferably between 30°~80° C. Molded products with most improved dimensional stability and surface property can be obtained if use is made of methyl methacrylate as an example of alkyl (meth)acrylate and the initial mold temperature is 60~80° C.

An essential point in the present invention is to make use of unsaturated urethane obtained from (1) radical polymerizable ester mono-ol, as its essential component is derived from (meth)acrylic acid and trihydric alcohol or polyol having three or four hydroxyl groups in the molecule, (2) diol (meth) acrylate and (3) diisocyanate having no urethane bonds in the molecule. Unsaturated urethane according to the present invention has three radical polymerizable groups in the molecule and the number of double bonds within its molecule is much greater and the molecular weight per double bond is lower than in the kinds of unsaturated urethane previously considered. According to the present invention, therefore, the density per unit volume of double bonds based on unsaturated urethane increases in a polymerizable composition even if the content of unsaturated urethane is the same. Thus, the density of cross links can be increased in molded products and the effect of a low shrinking agent can be enhanced. For the purpose of making a low shrinking agent more effective, it is preferable that the molecular weight of unsaturated urethane per double bond be no greater than 250, and more preferably no greater than 220.

Description of Experiments

Part 1 (Synthesis of unsaturated urethane and preparation of a liquid substance)

Preparation of unsaturated urethane "C" and liquid "C"

Taken in a flask were 87.1 weight parts of 2,4- and 2,6-mixed tolylene diisocyanate 192.1 weight parts of methyl methacrylate and 1.0 weight part of di-n-butyl tin dilaurate. It was stirred while being maintained at 50° C. and a mixture of 136.1 weight parts of ethylene glycol monoglycerylether dimethacrylate and 65.0 parts of 2-hydroxyethyl methacrylate was dropped over a period of 30 minutes. Although heat of reaction was generated in this process, the temperature inside the flask was maintained below 60° C. It was thereafter kept at 60° C. for a period of 1.5 hours to complete the synthesis. Liquid "c" containing 60 weight % of unsaturated urethane "C" was thus obtained.

Preparation of unsaturated urethane "R-1" and liquid "r-1"

Taken in a flask were 109.6 weight parts of polymethylene polyphenyl polyisocyanate containing an average of 3.5 isocyanate groups in the molecule, 148.2 weight parts of methyl methacrylate and 0.9 weight parts of di-n-butyl tin dilaurate. It was stirred while being maintained at 50° C. and 112.7 weight parts of 2-hydroxyethyl methacrylate were dropped over a period of 15 minutes. Although heat of reaction was generated in this process, the temperature inside the flask was maintained below 60° C. The synthesis was completed thereafter by keeping it at 60° C. for one hour. Liquid "r-1" containing unsaturated urethane "R-1" by 60 weight % was thus obtained.

Preparation of unsaturated urethane "R-2" and liquid "r-2"

Taken in a flask were 120 weight parts of polypropylene glycol (with average molecular weight of 600), 66 weight parts of methyl methacrylate and 0.8 weight parts of di-n-butyl tin dilaurate. It was stirred while being maintained at 50° C. and a solution obtained by dissolving 52 weight parts of the same mixed tolylene diisocyanate (as used for the synthesis of unsaturated urethane "B") in 66 weight parts of methyl methacrylate was dropped over a period of 30 minutes. Although heat of reaction was generated in this process, the temperature inside the flask was maintained within the range of 50°~60° C. It was thereafter kept at 60° C. for a period of 2 hours to complete the synthesis. What was thus obtained was a methyl methacrylate solution of polyurethane polyisocyanate with average molecular weight of 1720 having an average of 2 isocyanate groups in the molecule. Next, 0.5 weight parts of di-n-butyl tin laurate were added to this methyl methacrylate solution of polyurethane polyisocyanate obtained above and it was stirred while being kept at 50° C. Thereafter, 26 weight parts of 2-hydroxyethyl methacrylate were dropped over a period of 15 minutes while the interior temperature of the flask was maintained within the range of 55°-60° C. It was further maintained at 60° C. for 1 hour and 30 minutes to complete the synthesis. Liquid "r-2" containing 60 weight % of unsaturated urethane "R-2" was thus obtained.

In addition, Liquids "d"~"i" respectively containing unsaturated urethane "D"~"I" by 60 weight % were obtained similarly to the synthesis of unsaturated urethane "C". The types of polyisocyanate and radical polymerizable ester mono-ol used for the syntheses as well as the amounts by which they were used are shown in Table 1. Characteristics of the synthesized unsaturated urethane are shown in Table 2.

Part 2 (Preparation of polymerizable compositions, production of molded products by resin transfer molding (RTM) and their evaluation)

Preparation of polymerizable compositions

The liquid containing unsaturated urethane obtained in Part 1, a solution of thermoplastic macromolecular compound dissolved in methyl methacrylate, $Al_2O_3 \cdot H_2O$, N,N-dimethyl-p-toluidine as curing accelerator and a mold releasing agent was stirred uniformly to prepare the polymerizable compositions shown in Table 3.

Production of molded products

A glass strand continuous mat (Unifilo U-750, produced by Nihon Denki Garasu Company, Limited) was charged into a nickel metallized flat mold heated to 60° C. such that the glass content would become 25% and the mold was tightened to 2.5 kg/cm². Fixed amounts of each of the polymerizable compositions prepared as above and a radical initiator solution were separately brought together by means of a measuring pump and the both liquids were passed through a static mixer to be mixed uniformly and poured into the mold. The pouring was stopped at the point of time when the poured liquid began to flow out of the clearance opposite from the liquid intake. The product was removed from the mold 20 minutes after the pouring was stopped to obtain a molded product.

Evaluation of molded products

The appearance of each product was evaluated visually regarding fiber patterns and occurrence of cracks. They were evaluated according to the following standards:
A: None
B: Present a little
C: Present
D: Present a lot
The results of evaluation are shown also in Table 3.

Part 3 (Preparation of polymerizable compositions, production of molded products by casting molding and their evaluation)

Preparation of polymerizable compositions

The liquid containing unsaturated urethane obtained in Part 1, a solution of thermoplastic macromolecular compound dissolved in methyl methacrylate, N,N-dimethyl-p-toluidine as curing accelerator and a mold releasing agent was stirred uniformly to obtain the polymerizable compositions shown in Table 4. This polymerizable composition was degassed for one hour under the condition of 25° C. and reduced pressure and was used for the production of molded products.

Production of molded products

A mold with a clearance of 3 mm was constructed by sandwiching a polyethylene tube of outer diameter 5 mm with two glass sheets (25cm×25 cm) of thickness 5 mm. The degassed polymerizable composition was poured into this mold and a molded product was produced by keeping this mold inside a tank at constant temperature of 35° C. for one hour and leaving it for 12 hours thereafter at 80° C.

Evaluation of molded products

Each molded product thus obtained was cut to a length of 80mm and width of 25 mm to produce test pieces. The length, width and height of each test piece at 25° C. were measured accurately to calculate its volume and its weight was also accurately measured for calculating the density of the molded product at 25° C. The density at 25° C. of the degassed polymerizable composition from which the molded product was obtained was also measured separately. Shrinkage was calculated from these measured values according to the following formula: Shrinkage (%)=({(Density of molded product) - (Density of degassed polymerizable composition}/{Density of molded product})×100. The results are also shown in Table 4.

Part 4 (Preparation of polymerizable compositions, production of molded products by compression molding and their evaluation)

Preparation of polymerizable compositions

The liquid containing unsaturated urethane obtained in Part 1 and a solution of a low shrinking agent obtained by dissolving 30 weight parts of polymethyl methacrylate (Acrypet M produced by Mitsubishi Rayon Company, Limited) in 70 weight parts of methyl methacrylate was mixed as shown in Table 5. To 100 weight parts of this mixed liquid, 1 weight part of dibenzoyl peroxide, 4 weight parts of zinc stearate and 186 weight parts of inorganic powder filler material were added and they were mixed together by means of a kneader. The polymerizable composition thus obtained was a paste-like premix.

Production of molded products

A molded product was produced from the polymerizable composition thus obtained by using an SMC mold and a compression molding apparatus for one minute of compression molding at initial mold temperature of 80° C.

Evaluation of molded products

For each molded product thus obtained, its linear shrinkage was calculated by the following formula: Linear shrinkage (%)=({(Longitudinal dimension of the mold) - (Longitudinal dimension of the molded product)}/{Longitudinal dimension of the mold})×100. The results are shown in Table 5.

As can be seen clearly in the above, the present invention has the desirable effect of providing molded products with improved dimensional stability and surface property.

TABLE 1

| Unsaturated urethane (Type) | Polyisocyanate (Type and amount) | Radical polymerizable ester mono-ol (Type and amount) | Methyl methacrylate (Amount) |
| --- | --- | --- | --- |
| C | TDI: 87.1/0.5 | **2 136.1/0.5 **3 65.0/0.5 | 192.1 |
| D | TDI: 87.1/0.5 | **1 114.1/0.5 **3 65.0/0.5 | 264.6 |
| F | TDI: 87.1/0.5 | **2 136.1/0.5 **3 65.0/0.5 | 192.1 |
| H | TDI: 87.1/0.5 | **5 201.1/0.5 **3 65.0/0.5 | 235.5 |
| I | TDI 87.1/0.5 | **2 136.1/0.5 **6 101.0/0.5 | 216.2 |
| R-1 | MPI: 109.6/0.245 | **3 112.7/0.867 | 148.2 |
| R-2 | *1: 172/0.1 | **3 26/0.2 | 132 |

(Notes to Table 1):
Regarding "Amount", the number above "/" indicates the weight part and the number below "/" indicates mole;
MPI: Polymethylene polyphenyl polyisocyanate (Average 3.5 NCO);
TDI: Tolylene diisocyanate;
*1: Reaction product of {TDI/polypropylene glycol (average molecular weight = 600)} = 3/2 (molar ratio);
**1: Glycerine dimethacrylate;
**2: Ethyleneglycol monoglycerylether dimethacrylate;
**3: 2-hydroxyethyl methacrylate;
**5: Tripropyleneglycol monoglycerylether dimethacrylate;
**6: Dipropyleneglycol monomethacrylate

TABLE 2

| Type | Molecular Weight | Number of double bonds in molecule | Molecular weight per double bond |
|---|---|---|---|
| C | 576 | 3.0 | 192.0 |
| D | 532 | 3.0 | 177.3 |
| F | 576 | 3.0 | 192.1 |
| H | 706 | 3.0 | 235.3 |
| I | 648 | 3.0 | 216.0 |
| R-1 | 901.5 | 3.5 | 257.6 |
| R-2 | 1980 | 2.0 | 990.0 |

TABLE 3

| | Test Examples | | Comparison Examples | | | | |
|---|---|---|---|---|---|---|---|
| | 3 | 4 | 1 | 2 | 3 | 4 | 5 |
| (Polymerizable composition) | c | d | r-1 | r-2 | r-1 | r-2 | c |
| Unsaturated urethane liquid type | | | | | | | |
| Weight part | 100 | 100 | 100 | 100 | 100 | 100 | 100 |
| $Al_2O_3 \cdot 3H_2O$ | 50 | 50 | 50 | 50 | 50 | 50 | 50 |
| N,N-dimethyl-p-toluidine | 0.03 | 0.03 | 0.03 | 0.03 | 0.03 | 0.03 | 0.03 |
| Mold releasing agent | 0.5 | 0.5 | 0.5 | 0.5 | 0.5 | 0.5 | 0.5 |
| *2 | **9 | **7 | — | — | **7 | **7 | — |
| | 40 | 40 | — | — | 40 | 40 | — |
| (Radical initiator) *3 | 2 | 2 | 2 | 2 | 2 | 2 | 2 |
| (Results) | | | | | | | |
| Fiber patterns | A | A | D | C | C | C | D |
| Cracks | A | A | D | B | C | B | D |

(Notes)
Mold releasing agent: Mold Wiz (produced by Kozakura Shokai Company Limited);
*2: Solution of thermoplastic macromolecular compound in methyl methacrylate (type/weight part)
*3: 50% solution of dibenzoyl peroxide;
**7: Solution with 30 weight parts of polymethyl methacrylate (molecular weight = 50,000) dissolved in 70 weight parts of methyl methacrylate;
**9: 60 weight parts of methyl methacrylate dispersed and swollen by impregnation with 40 weight parts of powdered styrene-divinyl benzene copolymer;
Molded product from Comparison Example 3 had on its surface patched patterns of phase-separated thermoplastic macromolecular compound used as low shrinking agent

TABLE 4

| | Test Examples | | Comparison Examples | | | | |
|---|---|---|---|---|---|---|---|
| | 7 | 8 | 6 | 7 | 8 | 9 | 10 |
| (Polymerizable composition) | c | d | r-1 | r-2 | r-1 | r-2 | c |
| Unsaturated urethane liquid type | | | | | | | |
| Weight part | 100 | 100 | 100 | 100 | 100 | 100 | 100 |
| N,N-dimethyl-p-toluidine | *4 | *4 | *4 | *4 | *4 | *4 | *4 |
| Mold releasing agent | 0.5 | 0.5 | 0.5 | 0.5 | 0.5 | 0.5 | 0.5 |
| *2 | **9 | **7 | — | — | **7 | **7 | — |
| | 40 | 40 | — | — | 40 | 40 | — |
| (Radical initiator) *3 | 2 | 2 | 2 | 2 | 2 | 2 | 2 |
| (Results) Shrinkage | 2.4 | 2.6 | 13.1 | 7.5 | 7.8 | 7.5 | 13.8 |

(Notes)
See Notes to Table 3 regarding the unsaturated urethane liquid, mold releasing agent, *2, *3, 7 and 9;
*4: 0.075;
Molded product from Comparison Example 8 had on its surface patched patterns of phase-separated thermoplastic macromolecular compound used as low shrinking agent.

TABLE 5

| | Liquid of unsaturated urethane | | Added sol'n of low shrinking agent | Type of Inorganic powder filler | Linear shrinkage of molded product (%) |
|---|---|---|---|---|---|
| | Type | Wt part | Wt part | | |
| (Test Examples) | | | | | |
| 15 | f | 80 | 20 | $Al_2O_3 \cdot 3H_2O$ | 0.81 |
| 16 | f | 70 | 30 | $Al_2O_3 \cdot 3H_2O$ | 0.62 |
| 17 | f | 60 | 40 | $Al_2O_3 \cdot 3H_2O$ | 0.54 |
| 18 | i | 70 | 30 | Clacium carbonate | 0.59 |
| 19 | i | 60 | 40 | Calcium carbonate | 0.40 |
| 20 | i | 50 | 50 | Clacium carbonate | 0.31 |
| (Comparison Examples) | | | | | |
| 11 | r-1 | 100 | 0 | $Al_2O_3 \cdot 3H_2O$ | 1.21 |
| 12 | r-1 | 80 | 20 | $Al_2O_3 \cdot 3H_2O$ | 0.93 |

(Notes)
$Al_2O_3 \cdot 3H_2O$: B-703 produced by Nippon Keikinzoku Company, Limited with average particle size of 0.4 μm;
Calcium carbonate: SS80 produced by Nitto Funka Kogyo Company, Limited with average particle size of 2.6 μm

What is claimed is:

1. A polymerizable composition comprising unsaturated urethane shown by Formula 1 below; alkyl (meth)acrylate, and a thermoplastic macromolecular compound capable of dissolving in or swelling by impregnating said alkyl (meth)acrylate, said unsaturated urethane, said alkyl (meth)acrylate and said thermoplastic macromolecular compound being contained at weight ratios of (said unsaturated urethane)/(said alkyl (meth)acrylate)=10/90~90/10 and {(said unsaturated urethane) +(said alkyl (meth)acrylate)}/{said thermoplastic macromolecular compound}=100/1~100/100:

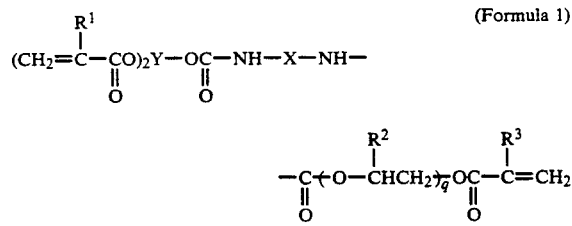

(Formula 1)

where X is a residual group obtainable by removing two isocyanate groups from diisocyanate having no urethane bond in the molecule; Y is a residual group obtainable by removing three hydroxy groups from trihydric polyol; $R^1$, $R^2$ and $R^3$ are same or different, each being H or $CH_3$; and q is an integer 1~5.

2. The polymerizable composition of claim 1 further comprising an inorganic powder filler at such weight ratio that {(said unsaturated urethane)+(said alkyl (methacrylate)}/{said inorganic powder filler}=100/40~100/230.

3. The polymerizable composition of claim 2 wherein said inorganic powder filler comprises $Al_2O_3 \cdot 3H_2O$.

* * * * *